United States Patent [19]

Lee et al.

[11] Patent Number: 5,648,308

[45] Date of Patent: Jul. 15, 1997

[54] PROCESS FOR UPGRADING METALLOCENE CATALYSTS

[75] Inventors: John Y. Lee; Steven P. Diefenbach, both of Baton Rouge, La.

[73] Assignee: Albemarle Corporation, Richmond, Va.

[21] Appl. No.: 513,653

[22] Filed: Aug. 10, 1995

[51] Int. Cl.$^6$ .............................. C08F 4/64; B01J 31/38
[52] U.S. Cl. .................... 502/104; 502/119; 502/120; 502/24; 502/515
[58] Field of Search ................. 502/104, 119, 502/120, 24, 29, 31, 919, 916

[56] References Cited

U.S. PATENT DOCUMENTS

| | | | |
|---|---|---|---|
| 4,892,851 | 1/1990 | Ewen et al. | 502/104 |
| 5,075,467 | 12/1991 | Desobry | 556/53 |
| 5,268,495 | 12/1993 | Riepl et al. | 556/11 |
| 5,340,701 | 8/1994 | Desobry | 430/325 |
| 5,349,100 | 9/1994 | Mintz | 585/350 |
| 5,455,366 | 10/1995 | Rohrmann et al. | 556/8 |

OTHER PUBLICATIONS

Grossman, R. B., et al., "Syntheses of [Ethylene-1,2-bis($\eta^6$-4,5,6,7,-tetrahydro-1-indenyl)]zirconium and –hafnium Hydride Complexes. Improved Syntheses of the Corresponding Dichlorides, Organometallics", vol. 10, No. 5, pp. 1501–1505, (1991).

Bajgur, et al., "Synthesis, Structural Characterization, and Electrochemistry of [1]Metallocenophane Complexes, [Si(alkyl)$_2$(C$_5$H$_4$)$_2$]MCl$_2$, M=Ti, Zr", Inorg. Chem., vol. 24, No. 16, pp. 2539–2546, (1985).

Wild, et al., "Synthesis and Molecular Structures of Chiral ansa–Titanocene Derivatives with Bridged Tetrahydroindenyl Ligands", J. Organometallic Chemistry, 232, pp. 233–247, (1982).

Summers, et al., Diaryl Bis–(cyclopentadienyl)–titanium Compounds[1], JACS, vol. 77, pp. 3604–3606, (1955).

*Primary Examiner*—Glenn A. Caldarola
*Assistant Examiner*—Bekir L. Yildirim
*Attorney, Agent, or Firm*—Philip M. Pippenger

[57] ABSTRACT

Inorganic and organic impurities are removed from a metallocene catalyst compound comprising the steps of (a) separating inorganic impurities from said compound by forming a solution of said compound in an organic solvent medium which is substantially a non-solvent for said inorganic impurities, (b) treating the solution of said compound with a particulate absorbing material so as to absorb and remove organic impurities from said solution, and (c) separating the solid material, including said particulate absorbing material, from said solution. Optionally, water can be removed by adding a drying agent.

9 Claims, No Drawings

PROCESS FOR UPGRADING METALLOCENE CATALYSTS

This invention relates generally to metallocene catalysts which are useful in olefin oligomerization and polymerization and more specifically to an expeditious process for removing impurities which can decrease the efficiency of such catalysts.

Metallocenes, when used in combination with co-catalysts such as aluminoxanes, boranes and/or borates are highly active single-site catalysts for olefin polymerization and co-polymerization. The metallocenes can be prepared by reacting a deprotonated ligand, which contains at least one cyclopentadienyl or a related group based on cyclopentadienyl such as indenyl or fluorenyl, with a transition, lanthanide or actinide metal compound, such as a metal halide, or by reacting the ligand with a metal amide. The metallocene product of this metallation reaction may contain both inorganic and organic impurities which, if not removed, can interfere with the activity and efficiency of metallocene when used for single-site catalysis in a gas-phase or slurry phase process. Such purification can involve a number of extraction and recrystallization steps which are time consuming and expensive. We have now found an effective, low cost process for effectively upgrading metallocene catalysts.

In accordance with this invention there is provided a process for removing inorganic and organic impurities from a metallocene catalyst compound comprising the steps of (a) separating inorganic impurities from said compound by forming a solution of said compound in an organic solvent medium which is substantially a non-solvent for said inorganic impurities, (b) treating the solution of said compound with a particulate absorbing material so as to absorb and remove organic impurities from said solution, and (c) separating the solid material, including said particulate absorbing material, from said solution. Optionally, water can be removed such as by using a drying agent.

The resulting solution can be used directly to deposit the purified metallocene on a solid, particulate material to form a supported catalyst such as for use in the gas phase or slurry olefin polymerization process. It can also be used directly as a homogeneous catalyst in a solution polymerization process.

Metallocene catalyst compounds which can be purified by the process of the invention are organometallic compounds of transition, and especially Group 3, 4, 5 and 6 metals, lanthanide metals and actinide metals. Non-limiting examples of such metals include Y, Ti, Zr, Hf, V, Ta, Ce, Th, U and Cr and the like. As used herein the term "metallocene" includes derivatives of the metals which contain at least one cyclopentadienyl type moiety. The compounds can be described as metallocene (or bent metallocene in the case of bis-cyclopentadienyl type derivatives) with ancillary anionic ligands or hydrocarbyl groups, such as $Z_t(\eta^5-R'_nH_mC_5)_sMX_{r-s}$, where R' is a carbon or carbon and heteroatom (N, O, S, P, B, Si and the like) containing group such as $C_1$ to $C_{20}$ alkyl, $C_3$ to $C_{12}$ cycloalkyl, $C_7$ to $C_{20}$ aralkyl or $C_6$ to $C_{14}$ aryl. Non-limiting examples of such R' groups include methyl, ethyl, trimethylsilyl, t-butyl, cyclohexyl, phenyl, 4-methylphenyl, 2,4,6-trimethylphenyl, 2-phenylethyl and the like. The R' substituents can be different in type and in number on each cyclopentadienyl ring and can form fused cyclic groups attached to the rings, such as indenyl, fluorenyl and further substituted derivatives thereof. Z is a bridging group between rings such as silane, phosphine, amine or carbon groups, t is 0 or 1, m and n are integers of 0 to 5, m+n=5 (or 4 if Z is present), r is 3 or 4, s is 1 or 2 when r=3 and 1 to 3 when r=4, M is a transition, lathanide or actinide metal and X is halogen or psuedohalogen (e.g. a leaving group in nucleophilic substitution such as ester, alkoxide, cyanide, tosylate, triflate, β-diketonate and the like), hydride or $C_1$ to $C_8$ alkyl or aryl.

Such metallocenes and other types are described, for example, in U.S. Pat. Nos. 2,864,843; 2,983,740; 4,665,046; 4,874,880; 4,892,851; 4,931,417; 4,952,713; 5,017,714; 5,026,798; 5,036,034; 5,064,802; 5,081,231; 5,145,819; 5,162,278; 5,245,019; 5,268,495; 5,276,208; 5,304,523; 5,324,800; 5,329,031; 5,329,033; 5,330,948; 5,347,025; 5,347,026; and 5,347,752, whose teachings with respect to such metallocenes are incorporated herein by reference.

Non-limiting illustrative examples of such metallocenes are bis(cyclopentadienyl)zirconium dimethyl, bis (cyclopentadienyl)zirconium dichloride, bis (dimethylcyclopentadienyl)zirconium dichloride, bis (methylethylcyclopentadienyl)zirconium dichloride, bis (methyl-n-propylcyclopentadienyl)zirconium dichloride, bis (methyl-n-butylcyclopentadienyl)zirconium dichloride, bis (cyclopentadienyl)zirconium monomethylmonochloride, bis (cyclopentadienyl)titanium dichloride, bis (cyclopentadienyl)titanium difluoride, cyclopentadienylzirconium tri-(2-ethylhexanoate), bis (cyclopentadienyl)zirconium hydrogen chloride, bis (cyclopentadienyl)hafnium dichloride, racemic and meso dimethylsilanylene-bis(methylcyclopentadienyl)hafnium dichloride, racemic dimethylsilanylene-bis(indenyl)hafnium dichloride, racemic ethylene-bis(indenyl)zirconium dichloride, ($\eta^5$-indenyl)hafnium trichloride, ($\eta^5$—$C_5Me_5$) hafnium trichloride, racemic dimethylsilanylene-bis (indenyl)thorium dichloride, racemic dimethylsilanylene-bis(4,7-dimethyl-1-indenyl)zirconium dichloride, racemic dimethylsilanylene-bis(indenyl)uranium dichloride, racemic dimethylsilanylene-bis(2,3,5-trimethyl-1-cyclopentadienyl) zirconium dichloride, racemic dimethylsilanylene(3-methylcyclopentadienyl)hafnium dichloride, racemic dimethylsilanylene-bis(1-(2-methyl-4-ethylindenyl zirconium dichloride; racemic dimethylsilanylene-bis(2-methyl-4,5,6,7-tetrahydro-1-indenyl)zirconium dichloride, bis (pentamethylcyclopentadienyl)thorium dichloride, bis (pentamethylcyclopentadienyl)uranium dichloride, (tert-butylamide)dimethyl(tetramethyl-$\eta^5$-cyclopentadienyl) silanetitanium dichloride, (tert-butylamide)dimethyl (tetramethyl-$\eta^5$-cyclopentadienyl)silanechromium dichloride, (tert-butylamide)dimethyl(-$\eta^5$-cyclopentadienyl)silanetitanium dichloride, (tert-butylamide)dimethyl(tetramethyl-$\eta^5$-cyclopentadienyl) silanemethyltitanium bromide, (tert-butylamide) (tetramethyl-$\eta^5$-cyclopentadienyl)-1,2-ethanediyluranium dichloride, (tert-butylamide)(tetramethyl-$\eta^5$-cyclopentadienyl)-1,2-ethanediyltitanium dichloride, (methylamido)(tetramethyl-$\eta^5$-cyclopentadienyl)-1,2-ethanediylcerium dichloride,(methylamido)(tetramethyl-$\eta^5$-cyclopentadienyl) 1,2-ethanediyltitanium dichloride, (ethylamido)(tetramethyl-$\eta^5$-cyclopentadienyl) methylenetitanium dichloride, (tert-butylamide)dibenzyl (tetramethyl-$\eta^5$-cyclopentadienyl)silanebenzylvanadium chloride, (benzylamido)dimethyl(indenyl)silanetitanium dichloride, and (phenylphosphido)dimethyl(tetramethyl-$\eta^5$-cyclopentadienyl)silanebenzyl-titanium chloride.

The metallocenes can be prepared as known in the art by, for example, reacting the appropriate ligand with a deprotonating agent such as an alkali metal, an alkali metal alkyl, or a Grignard reagent and then reacting the resulting ligand salt with the transition, lanthanide or actinide metal compound. Suitable deprotonating agents include, for example, Li metal, Na powder, RLi, NaH, LiH, KH or a Grignard reagent (RMgX, where R is $C_1$ to $C_{10}$ hydrocarbyl and X is halogen). Preferred are alkyllithium compounds such as methyllithium, n-butyllithium, s-butyllithium, t-butyllithium, phenyl-lithium, and the like.

Usually, the deprotonating agent contained in a hydrocarbon solvent such as hexanes, cyclohexane, heptane, pentane, toluene and the like, is added to an acyclic or cyclic ether solution of the ligand. Alternatively, the deprotonating agent in hexanes or a mixture of hexanes and toluene can be added to the dry ligand, with diethyl ether or THF being added, if necessary, to provide a thinner, more workable solution.

The metal compound is usually used in the form of its ether or THF complex; although it can be used directly as a metal halide. The ligand salt need not be recovered from the deprotonation reaction mixture prior to the metallization reaction and can be added to the metal compound or vise versa.

The metal compound such as a metal halide may contain impurities and is usually used in about a 10% stoichiometric excess to provide sufficient metal to react with the deprotonated ligand. These impurities will be carried over into the crude metallocene product. Common impurities in the metal compounds are metal oxides which must be removed because the presence of oxygen in the catalyst can effect its performance as a single-site catalyst. Also, organic impurities, whose presence can be noted by the color of the product, can also effect catalyst performance. The process of the invention effectively and efficiently removes the metal oxide and other inorganic impurities, such as unreacted metal halides, along with the organic impurities from the crude metallocene product. The removal can be carried out in a single vessel.

In the first step of the process the solid product is extracted with a solvent medium so that the solid product dissolves in the solvent medium but the inorganic metal oxides and/or chlorides remain substantially undissolved. The solvent medium, depending upon the solubility of the particular metallocene, can be selected from aliphatic and aromatic hydrocarbon or polar solvents or a combination of such aliphatic, aromatic and/or polar solvents. Non-limiting examples of such solvents include, aliphatic hydrocarbons such as pentane, hexane, heptane, aromatic hydrocarbons and halohydrocarbons such as benzene, chloroform, methylene chloride, toluene, xylenes, and chlorobenzene. In certain cases ether solvents such as diethyl ether can be used.

Sufficient solvent is used to completely dissolve the product without dissolving any substantial portion of the inorganic impurities at the temperature employed which is, preferably, ambient temperatures such that heating or cooling which is required in recrystallization processes is unnecessary. In general, sufficient solvent to produce from about 5 to 50 weight percent solutions of product is used.

Although it is possible to remove the solid inorganic impurities such as by filtration prior to removal of the organic impurities, this is not necessary because a particulate organic impurity absorbing material can be added to the solution, and then both the solid inorganic impurities and the organic impurity absorbing material can be removed at the same time.

Non-limiting examples of organic impurity removing materials include silica, alumina, silica-alumina, magnesia, zirconia, titania, carbon black, zeolite and the like. The particle size and porosity are not critical. Preferred, are dried, porous silicas having a water content of 5 percent or less, —OH group contents of from about 0.1 to 3 percent, pore volumes of from about 0.5 to 3.5 cc/gram and a particle size of from about 30 to 600 microns. The preferred amount of absorbent usually ranges from about 0.1 to 1.0 grams per gram of product to be purified.

The purified solution can be separated from the absorbent and solid inorganic impurities such as by filtration. For example, the solution can be poured into a glass column which has a coarse frit plate and the product containing filtrate recovered. The solid filter cake can be washed with additional solution to recover additional product. In another embodiment, the solution can be passed into the absorbent which is supported in a short column to begin with. In either case, the solution can be recycled through the column one or more times so as to remove additional organic impurities.

The product metallocene can be recovered by removal of the solvent or the solution can be used directly to form a supported catalyst, such as for use in the gas phase or slurry polymerization process. It can also be used as a homogeneous catalyst in the solution polymerization process. The metallocene can be deposited from the solution onto a catalyst support before or after reacting the metallocene with a co-catalyst such as an aluminoxane, a borane, a borate or a mixture thereof. Any water which is introduced into the metallocene solution by the purification process can be removed by drying techniques such as by passing the solution through activated molecular sieves.

The invention is further illustrated by, but is not intended to be limited to, the following examples.

EXAMPLE 1

Crude bis(1-n-butyl-3-methylcyclopentadienyl) zirconium dichloride (5.3 grams) which contains about 3 weight percent inorganic zirconium chloride/oxide impurities is placed in a vessel and sufficient heptane is added with stirring to give 25.0 grams (~21%) of solution and the mixture is stirred at 22° C. for 0.5 hour to precipitate inorganic impurities. Dried silica (Davidson 952, 3.0 percent OH group by LOI, 1 gram) is added to the solution at 22° C. to absorb organic impurities and stirred for just less than one minute; the silica becomes dark brown in color and the n-heptane solution changes from an original brown color to yellow/orange. The mixture is filtered through a glass column equipped with a coarse-frit plate to remove the solid inorganic impurities and the colored silica. The filtration is repeated twice by passing the solvent back through the column such that the heptane solution becomes pale yellow. The filter cake is rinsed twice with heptane (2×12.5 g.) And a total of 47.34 grams of solvent is collected. The heptane is removed (50° C./27 in Hg vacuum) to give 4.68 g. (88 percent recovery) of pure bis(1-n-butyl-3-methylcyclopentadienyl)zirconium dichloride. Toluene is added to give a 25 weight percent solution; proton NMR shows that it contains a trace of water. In the heptane solution the water does not hydrolyze the product to form oxo impurities i.e. the metallocene is stable under the process conditions used. About 0.5 g. Of activated 4A molecular sieves is added to remove the water (2 hours). Proton NMR shows that the pale yellow toluene solution contains 25.0 weight percent pure metallocene product.

EXAMPLE 2

Bis(n-butylcyclopentadienyl)zirconium dichloride (1.0 gram, light-tan color, mp 96°–98° C., 96% pure) is dissolved at 22° C. with stirring in a solvent mixture of pentane (6.0 grams) and methylene chloride (4.0 grams). This cloudy, yellow-orange solution is filtered through a glass funnel equipped with a coarse-frit plate to remove the solid impurities. The orange, wet cake is rinsed twice with the same pentane/methylene chloride solvent (2×2.0 grams) and about 14 grams of yellow solution is collected (in which there is 0.94 gram of metallocene product). Dried silica (Davidson 952, 3.0 percent OH group by LOI, 0.37 gram) is added with stirring at 22° C. into the metallocene solution to absorb organic impurities. Just within one minute, the silica becomes yellow in color and the pentane/methylene chloride solution changes from an original yellow color to water-clear. Again the mixture is filtered through a glass funnel equipped with a coarse-frit plate to remove the colored silica. The filter cake is rinsed once with 4.0 grams of pentane/methylene chloride solvent and a total of about 16 grams of solution is collected. The solvent is removed at 10°–22° C./20–27 in Hg vacuum to give 0.87 gram of snow-white bis(n-butylcyclopentadienyl)zirconium dichloride (mp 98°–100° C., 99% pure).

What is claimed is:

1. A process for removing inorganic and organic impurities from a metallocene catalyst compound comprising the steps of (a) separating inorganic impurities from said compound by forming a solution of said compound in an organic solvent medium which is substantially a non-solvent for said inorganic impurities, (b) treating the solution of said compound with a particulate absorbing material so as to absorb and remove organic impurities from said solution, and (c) separating the solid material, including said particulate absorbing material, from said solution.

2. The process of claim 1 wherein said particulate absorbing material is an porous inorganic oxide.

3. The process of claim 2 wherein said porous inorganic oxide is silica.

4. The process of claim 1 wherein the absorbing material and the inorganic impurities are simultaneously separated from said solution by filtration.

5. The process of claim 4 wherein the filtrate is recycled through the filter cake.

6. The process of claim 1 wherein, after the solid material has been removed from the solution, the solution is contacted with a solid, particulate material so as to deposit the metallocene on said material.

7. The process of claim 1 including the step of removing water from said solution.

8. The process of claim 7 wherein the water is removed by adding a drying agent to the solution.

9. The process of claim 1 wherein said metallocene is a Group 4 metal compound.

* * * * *